(12) United States Patent
Wong et al.

(10) Patent No.: US 7,649,461 B2
(45) Date of Patent: Jan. 19, 2010

(54) PASSIVE RADIO FREQUENCY IDENTIFICATION CHIP WITH A VARIABLE-CAPACITANCE DIODE

(75) Inventors: Shih-Fang Wong, Guangdong (CN);
Tsung-Jen Chuang, Guangdong (CN);
Jian-Lin Liu, Guangdong (CN)

(73) Assignees: Hong Fu Jin Precision Industry (Shen Zhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 361 days.

(21) Appl. No.: 11/747,194

(22) Filed: May 10, 2007

(65) Prior Publication Data
US 2008/0068167 A1    Mar. 20, 2008

(30) Foreign Application Priority Data
Sep. 20, 2006    (CN) .................. 2006 1 0200887

(51) Int. Cl.
*G08B 13/14*    (2006.01)
(52) U.S. Cl. ..................... 340/572.1; 361/56

(58) Field of Classification Search ............. 340/572.1, 340/10.1; 361/54, 56
See application file for complete search history.

(56) References Cited

U.S. PATENT DOCUMENTS 6,229,443 B1    5/2001    Roesner
2008/0083969 A1*    4/2008    Osada ................ 257/595

* cited by examiner

*Primary Examiner*—Jeffery Hofsass
(74) *Attorney, Agent, or Firm*—Winston Hsu

(57) ABSTRACT

A passive radio frequency identification (RFID) chip with a protection function against high-intensity electromagnetic fields includes an antenna for receiving electromagnetic waves generated by an RFID reader and generating AC electrical signals to output to a power unit at an output of the antenna; an input/output circuit; a logic circuit; the power unit for rectifying the AC electrical signals into DC (direct current) voltage and outputting the DC voltage to the logic circuit and the input/output circuit at an output of the power unit; a variable-capacitance diode including an anode connected with the output of the antenna and a cathode connected to ground; and a diode including an anode connected with the output of the power unit and a cathode connected with the output of the antenna. The passive RFID chip prevents the inner logic circuit and the input/output circuit from being damaged when receives high-intensity electromagnetic waves.

5 Claims, 2 Drawing Sheets

PASSIVE RADIO FREQUENCY IDENTIFICATION CHIP WITH A VARIABLE-CAPACITANCE DIODE

BACKGROUND OF THE INVENTION

1. Field of the Invention

The invention relates to passive radio frequency identification (RFID) chips, and more particularly, to a passive RFID chip with a protection function against high-intensity electromagnetic fields.

2. Description of Related Art

FIG. 1 shows a schematic circuit diagram of a typical passive RFID chip in the existing arts. The passive RFID chip 1 includes an antenna 100, a power unit 200 connected to the antenna 100, an input/output circuit 300, and a logic circuit 400 both connected to the power unit 200. The typical passive RFID chip 1 receives electromagnetic waves 8 from an RFID reader and operates according to electromagnetic energy carried by the electromagnetic waves.

The antenna 100 receives the electromagnetic waves 8 from the RFID reader and generates AC (alternating current) electrical signals to output to the power unit 200. The power unit 200 includes two diodes and two capacitors that are connected in a form for rectifying and smoothing the electrical signals sent by the antenna 100 and outputting a stable DC (direct current) voltage VDD. In this sense, the power unit 200 serves as a DC voltage source and supplies power to the input/output circuit 300 and the logic circuit 400.

The significant advantage of the typical passive RFID chip is that the typical passive RFID chip enables an RFID reader to retrieve identifying information from an RFID device that is configured with the typical passive RFID chip wirelessly. The RFID device only needs to be positioned near the RFID reader to easily retrieve the identifying information. However retrieving the identifying information at a relative longer distance is also desired. But, to retrieve identifying information at a longer distance, the RFID reader needs to generate high-energy electromagnetic waves. Accordingly, the DC voltage VDD outputted by the power unit 200 would also increase, and may damage the logic circuit 400 of the typical RFID chip.

Therefore, a heretofore unaddressed need exists in the industry to overcome the aforementioned deficiencies and inadequacies.

SUMMARY OF THE INVENTION

The passive radio frequency identification (RFID) chip with a protection function against high-intensity electromagnetic fields includes an antenna for receiving electromagnetic waves generated by an RFID reader and generating AC electrical signals to output to a power unit at an output of the antenna; an input/output circuit; a logic circuit; the power unit for rectifying the AC electrical signals into DC (direct current) voltage and outputting the DC voltage to the logic circuit and the input/output circuit at an output of the power unit; a variable-capacitance diode including an anode connected with the output of the antenna and a cathode connected to ground; and a diode including an anode connected with the output of the power unit and a cathode connected with the output of the antenna.

Other systems, methods, features, and advantages will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION OF THE INVENTION

Figure 1:
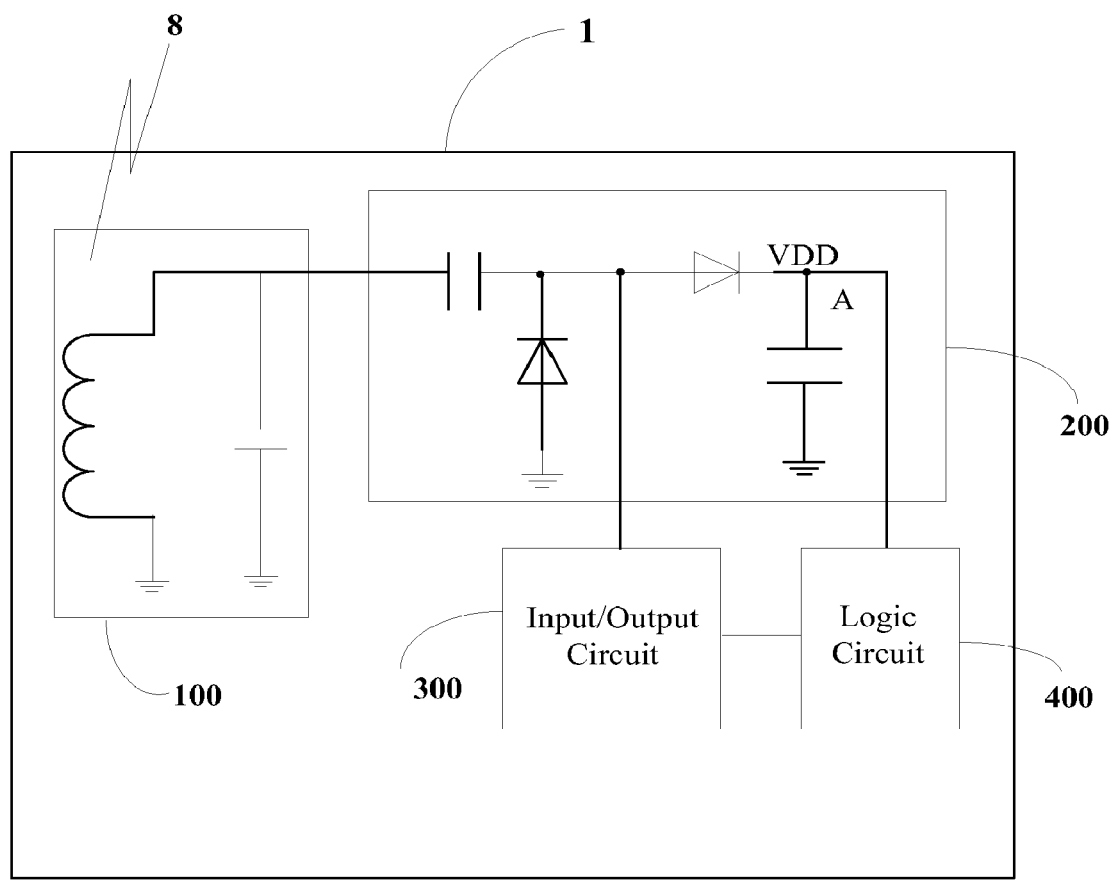
FIG. 1 is a schematic circuit diagram of a typical passive RFID chip in existing arts.
Figure 2:
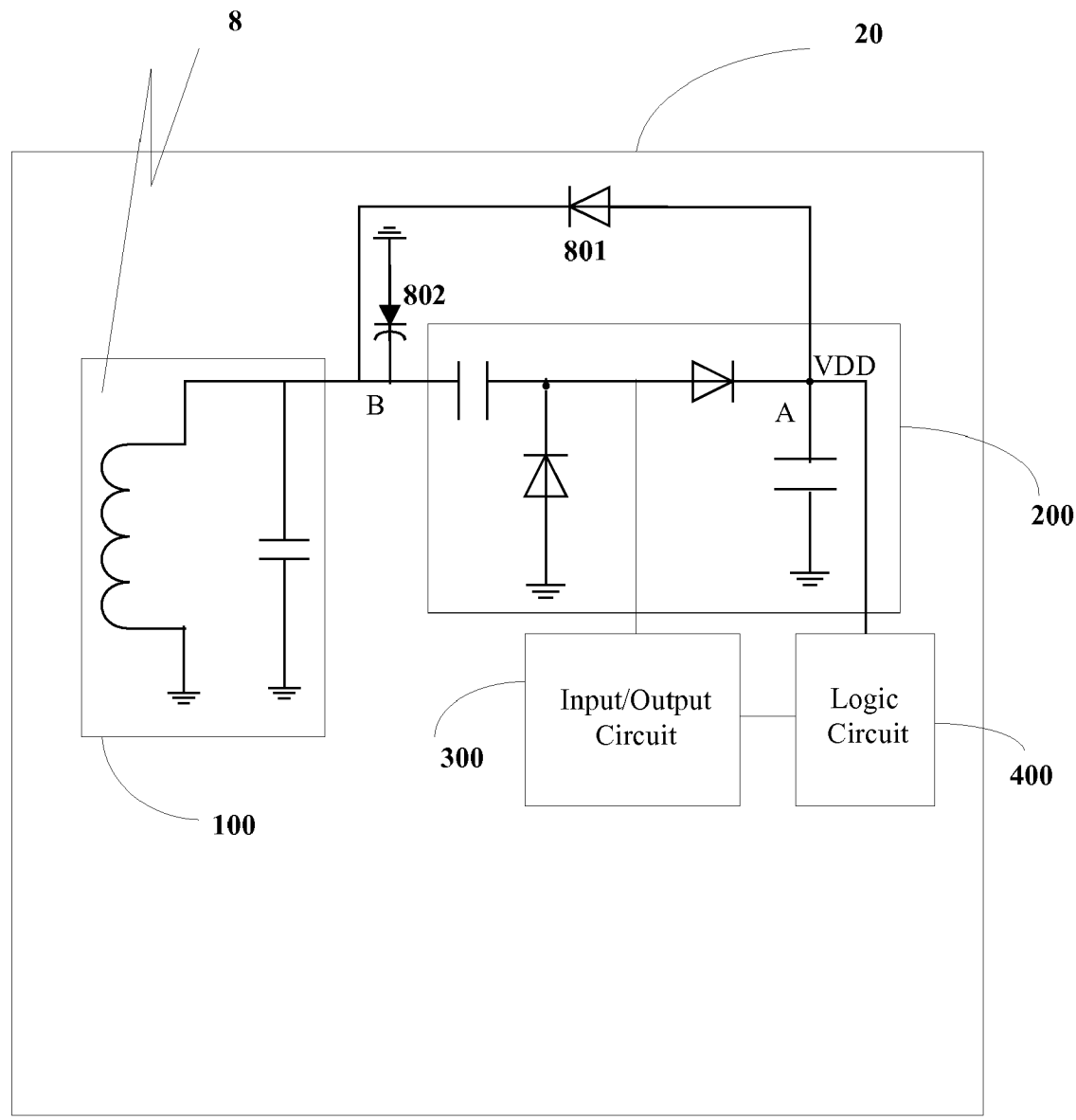
FIG. 2 is a schematic circuit diagram of a passive RFID chip in accordance with an preferred embodiment of the present invention.

FIG. 2 is a schematic circuit diagram of a passive RFID chip with a protection function against high-intensity electromagnetic fields. The passive RFID 20 includes an antenna 100, a power unit 200, an input/output circuit 300, and a logic circuit 400. The passive RFID chip 20 provided by the preferred embodiment of the present invention further includes a variable-capacitance diode 802 and a diode 801. Node B is connected to 802, 801, 100 and 200. The variable-capacitance diode 802 includes an anode connected with the antenna 100, and a cathode connected to ground. The variable-capacitance diode 802 has a threshold voltage that is greater than a safe voltage of the passive RFID chip 20. In the preferred embodiment, the safe voltage is a predetermined maximum voltage value that allows a normal operational of the passive RFID chip 20. In other words, voltages over the safe voltage will cause damage to the logic circuit 400 and other inner circuits of the passive RFID chip 1, this can be avoided if the passive RFID chip works at or under the safe voltage. The diode 801 is connected between node B and the output of the power unit 200. As shown, the output of the power unit 200 is VDD or Node A.

If the passive RFID chip 20 receives normal-intensity electromagnetic waves, the output voltage VDD of the power unit 200 is below the safe voltage. The voltage at the node A is lower than the threshold voltage of the variable-capacitance diode 802, and the variable-capacitance diode 802 accordingly switches off via a feedback by the diode 801.

If the passive RFID chip 20 receives high-intensity electromagnetic waves, the output voltage VDD of the power unit 200 increases. If the output voltage of VDD via the feedback by the diode 801 is greater than the safe voltage of the passive RFID chip 1, the voltage of node B is greater than the threshold voltage of the variable-capacitance diode 802, this cause the variable-capacitance switching on and accordingly actuating. The variable-capacitance diode 802 is connected with the antenna 100 in parallel and results in a decrease in a quality factor (Q value) of the antenna 100. The decrease in the quality factor of the antenna 100 causes generation of relative lower amplitude AC signals (e.g., a relative lower energy AC signals), accordingly a relative lower output voltage VDD is outputted by the power unit 200. Therefore, when high-intensity electromagnetic waves are received, by utilizing the diode 801 to constitute a feedback path from an output of the power unit 200 to an output of the antenna 100 and by connecting the variable-capacitance diode 802 with the antenna 100 in parallel to decrease the quality factor of the antenna 100, the passive RFID chip 20 prevents the logic circuit 400 and the input/output circuit 300 from being damaged.

Although the present invention has been specifically described on the basis of a preferred embodiment and preferred method thereof, the invention is not to be construed as being limited thereto. Various changes or modifications may be made to the embodiment and method without departing from the scope and spirit of the invention.

What is claimed is:

1. A passive radio frequency identification (RFID) chip with a protection function against high-intensity electromagnetic fields comprising:
   an antenna for receiving electromagnetic waves generated by an RFID reader and said antenna generating AC electrical signals to output to a power unit at an output of the antenna;
   an input/output circuit;
   a logic circuit;
   the power unit for rectifying the AC electrical signals into DC (direct current) voltage and outputting the DC voltage to the logic circuit and the input/output circuit at an output of the power unit;
   a variable-capacitance diode comprising an anode connected with the output of the antenna and a cathode connected to ground; and
   a diode comprising an anode connected with the output of the power unit and a cathode connected with the output of the antenna.

2. The passive RFID chip according to claim 1, wherein the passive RFID chip has a safe voltage and the variable-capacitance diode has a threshold voltage greater than the safe voltage of the passive RFID chip.

3. The passive RFID chip according to claim 2, wherein the variable-capacitance diode is connected with the antenna in parallel and the connection accordingly decreases a quality factor of the antenna when the variable-capacitance diode switches on.

4. The passive RFID chip according to claim 3, wherein the variable-capacitance diode switches on when the output DC voltage of the power unit is higher than the threshold voltage of the variable-capacitance diode.

5. The passive RFID chip according to claim 1, wherein the variable-capacitance diode switches off when the output DC voltage of the power unit is lower than the threshold voltage of the variable-capacitance diode.

* * * * *